(12) United States Patent
Skillcorn et al.

(10) Patent No.: US 9,135,118 B2
(45) Date of Patent: Sep. 15, 2015

(54) SYSTEM TO CATALOG AND SEARCH POINT-IN-TIME INSTANCES OF A FILE SYSTEM

(75) Inventors: Stephen Robert Skillcorn, Eastsound, WA (US); Robert Quentin Cordell, II, Los Gatos, CA (US); Richard John Clark, Los Gatos, CA (US)

(73) Assignee: Aptare, Inc., Campbell, CA (US)

( * ) Notice: Subject to any disclaimer, the term of this patent is extended or adjusted under 35 U.S.C. 154(b) by 191 days.

(21) Appl. No.: 13/414,007

(22) Filed: Mar. 7, 2012

(65) Prior Publication Data

US 2012/0233172 A1   Sep. 13, 2012

Related U.S. Application Data

(60) Provisional application No. 61/450,013, filed on Mar. 7, 2011.

(51) Int. Cl.
G06F 17/30 (2006.01)
G06F 11/14 (2006.01)

(52) U.S. Cl.
CPC ...... *G06F 11/1448* (2013.01); *G06F 17/30088* (2013.01); *G06F 17/30091* (2013.01)

(58) Field of Classification Search
USPC .................................. 707/624, 646
See application file for complete search history.

(56) References Cited

U.S. PATENT DOCUMENTS

| | | | |
|---|---|---|---|
| 5,005,122 A | 4/1991 | Griffin et al. | |
| 5,276,867 A | 1/1994 | Kenley et al. | |
| 5,652,865 A | 7/1997 | Rawlings, III | |
| 5,974,242 A | 10/1999 | Damarla et al. | |
| 6,397,351 B1 | 5/2002 | Miller et al. | |
| 6,453,325 B1 | 9/2002 | Cabrera et al. | |
| 6,466,978 B1 | 10/2002 | Mukherjee et al. | |
| 6,480,864 B1 | 11/2002 | Fong et al. | |
| 6,640,055 B2 | 10/2003 | Nishimura et al. | |
| 7,007,046 B2 * | 2/2006 | Manley et al. | 707/624 |
| 7,035,840 B2 | 4/2006 | Nakos et al. | |
| 7,370,164 B1 * | 5/2008 | Nagarkar et al. | 711/162 |
| 7,546,431 B2 * | 6/2009 | Stacey et al. | 711/165 |
| 7,558,927 B2 | 7/2009 | Clark et al. | |
| 7,657,509 B2 | 2/2010 | Clark et al. | |
| 8,190,574 B2 * | 5/2012 | Barnes et al. | 707/646 |
| 8,495,022 B1 * | 7/2013 | Zhu et al. | 707/645 |
| 8,515,911 B1 * | 8/2013 | Zhou et al. | 707/638 |

(Continued)

FOREIGN PATENT DOCUMENTS

| | | |
|---|---|---|
| WO | WO 99/09480 | 2/1999 |
| WO | WO 99/12098 | 3/1999 |

(Continued)

OTHER PUBLICATIONS

International Search Report dated Nov. 8, 2010 in PCT Application No. PCT/US2010/38876.

(Continued)

*Primary Examiner* — James E Richardson
(74) *Attorney, Agent, or Firm* — Beyer Law Group LLP

(57) ABSTRACT

A system to catalog and search point-in-tine instances of a file system is disclosed. A catalog engine takes backups of file data generated by a storage system and catalogs the backups of file data into a searchable catalog of independent metadata records. The metadata is represented by baseline structure and delta files.

9 Claims, 12 Drawing Sheets

(56) References Cited

U.S. PATENT DOCUMENTS

| | | | |
|---|---|---|---|
| 2002/0049744 A1 | 4/2002 | Nakos et al. | |
| 2002/0091710 A1 | 7/2002 | Dunham et al. | |
| 2002/0099907 A1 | 7/2002 | Castelli et al. | |
| 2002/0152277 A1 | 10/2002 | Drees | |
| 2002/0174139 A1 | 11/2002 | Midgley et al. | |
| 2003/0028736 A1 | 2/2003 | Berkowitz et al. | |
| 2003/0061537 A1 | 3/2003 | Cha et al. | |
| 2003/0182326 A1* | 9/2003 | Patterson | 707/204 |
| 2004/0002989 A1 | 1/2004 | Kaminer | |
| 2005/0065986 A1* | 3/2005 | Bixby et al. | 707/204 |
| 2006/0173956 A1 | 8/2006 | Ulrich et al. | |
| 2006/0225072 A1 | 10/2006 | Lari et al. | |
| 2007/0179999 A1* | 8/2007 | Kamei et al. | 707/204 |
| 2007/0255765 A1* | 11/2007 | Robinson | 707/203 |
| 2007/0276885 A1* | 11/2007 | Valiyaparambil et al. | 707/204 |
| 2008/0059541 A1* | 3/2008 | Fachan et al. | 707/204 |
| 2008/0228843 A1 | 9/2008 | Dodge et al. | |
| 2010/0241614 A1* | 9/2010 | Shaull et al. | 707/649 |
| 2011/0225429 A1* | 9/2011 | Papamanthou et al. | 713/189 |

FOREIGN PATENT DOCUMENTS

| | | |
|---|---|---|
| WO | WO 01/06367 | 1/2001 |
| WO | WO 01/48609 | 7/2001 |

OTHER PUBLICATIONS

Written Opinion dated Nov. 8, 2010 in PCT Application No. PCT/US2010/38876.
Office Action dated Sep. 8, 2008 in U.S. Appl. No. 10/555,603.
Office Action dated Dec. 11, 2007 in U.S. Appl. No. 10/555,603.
Supplemental European Search Report dated Sep. 4, 2009, in EP Application No. 04751517.
Office Action dated Mar. 31, 2008 in U.S. Appl. No. 10/555,602.

\* cited by examiner

SYSTEM TO CATALOG AND SEARCH POINT-IN-TIME INSTANCES OF A FILE SYSTEM

CROSS REFERENCE TO RELATED APPLICATIONS

This application claims priority to and the benefit of U.S. Provisional Application No. 61/450,013, filed Mar. 7, 2011, the contents of which are hereby incorporated by reference.

FIELD OF THE INVENTION

The present invention is generally directed to cataloging backups in a file system, where a backup may include a backup of a file system, a point-in-time copy of a file system, or a snapshot of a file system.

BACKGROUND

Storage systems are capable of persisting files and folders as represented by a hierarchy of folders (directories), each containing files and additional child folders. In addition to persisting the constantly changing set of files and folders, storage systems are capable of taking consistent point-in-time copies or backups of a file system exactly as it exists at the time the backup is taken.

A collection of files held on a storage system may also be associated with a virtual machine. These files will contain an additional virtualized file system inside of them. In addition, many virtual machine hypervisors can take point-in-time backups of the file systems of the virtual machines they coordinate.

A problem in the prior art is that although the underlying infrastructure makes the creation of point-in-time backups of file systems simple, there currently does not exist any mechanism to catalog and easily and effectively search the contents of the file system backups to locate the files or directories they contain.

The inventors of the present application have recognized that this is a severe problem requiring a solution due in part to scalability problems with traditional solutions. The amount of data stored by organizations is expanding at an extraordinary rate.

Traditional solutions of cataloging a file system, such as storing the data in a Relational Database Management System have become impractical. This is especially true when light weight, point-in-time backups are considered. While these backups may be light weight to create and with respect to the storage they occupy, these backups introduce potentially millions of new records into the catalog. The deletion of a backup also requires the catalog to purge potentially millions of records.

This creation and deletion of point-in-time backups can be happening on many thousands of devices within an organization simultaneously. There is no known invention in the prior art that specifically addresses the notion of cataloging constantly changing file system backups on a scale experienced in today's enterprise data centers.

SUMMARY OF THE INVENTION

A system to search point-in-time instances of a file system includes a catalog engine. The catalog engine uses as inputs the backups of data generated by a storage system and catalogs these backups into a searchable catalog of independent metadata records. The metadata is represented by baseline structure and delta files.

In one embodiment a computer implemented method for storing a catalog includes directory metadata for a plurality of backups of file items at numerous points in time. The method includes storing the catalog on at least one tangible computer readable medium, wherein the catalog of directory metadata is tangibly embodied in the at least one tangible computer readable medium organized in records. The record may be arranged as baseline files and deltas.

In one embodiment the catalog engine is used in a backup system to catalog backup data for the backup system. The catalog engine may be used with a backup system to catalog backup data and provide a searchable catalog.

DETAILED DESCRIPTION OF THE INVENTION

The present invention is directed to cataloging point-in-time backups of a storage system. A snapshot is an example of a point-in-time backup. Embodiments of the invention are applicable to backups of file systems, point-in-time copies of file systems, and snapshots of file systems. That is, as used in this application the term "backup" broadly includes a backup of a file system, a point-in-time copy of a file system, and a snapshot of a file system. The catalog may include metadata of directory information to index the snapshots to form a catalog of metadata about backups. An application of the catalog is to permit searches to be performed to identify records of snapshots for particular files.

For the purposes of this application, a storage system means any system or structure maintaining a logical representation of a hierarchical file system. This may be, amongst many other things, a computer system with directly attached storage, a storage appliance, a virtualized file system on a hypervisor, a virtualized file system stored on a disk, an archived file system such as a zip file, a tape library or a file system represented as records in some form of database.

Building a catalog of file system backups has unique requirements in the characteristics of its operations because of the unique create, read, update, and delete profile. A more traditional RDBMS is designed to perform a relatively balanced number of create, read, update and delete operations. A file system backup catalog, on the other hand, has these characteristics:

1. constant large atomic bulk inserts of new data;
2. constant large atomic bulk deletes of data;
3. no updates (the file system backups are read only); and
4. a very small number of searches (read) compared to the number of inserts and deletes.

There is no known invention in the prior art that is specifically tuned to meet these requirements.

Figure 1:
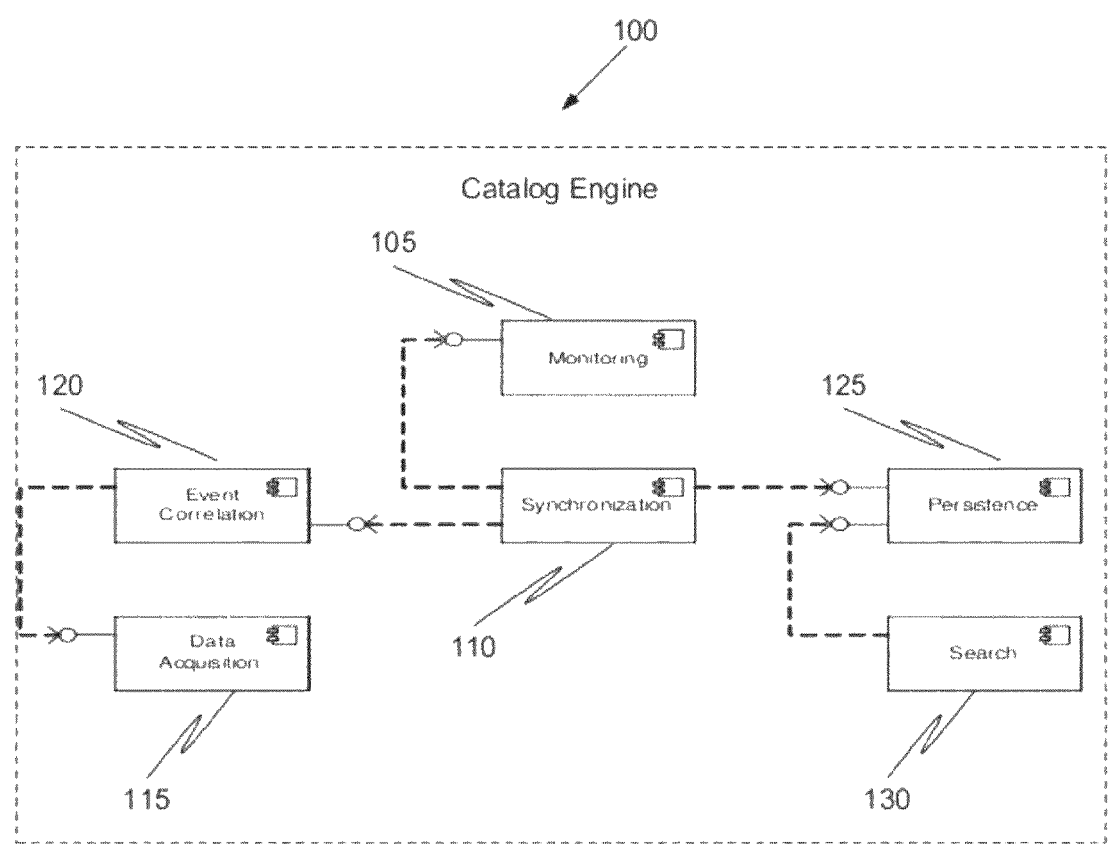
FIG. 1 is a block level diagram illustrating major components of an embodiment of the invention for a catalog engine.

FIG. 1 is a block level diagram illustrating major components of an embodiment of the invention for a catalog engine. The catalog engine 100 may be implemented as software stored on a non-transitory computer readable medium that is capable of being executed by a processor, such as a computer processor of a server having an associated storage medium for storing data and computer instructions. A catalog is a data structure capable of being stored on a compute readable medium, such as on a disc drive.

Referring to FIG. 1, in one embodiment of the invention a catalog engine 100, divides the task of creating and searching a catalog of point-in-time backups of file systems into six major block component module functions:

1. monitoring 105, or alerted by, the (cataloged) storage system for the creation or deletion of point-in-time backups;
2. synchronizing 110 the catalog with the storage system;
3. acquiring 115 data from the cataloged storage system of the contents of the backup, or the differences between two backups;
4. correlating 120 a stream of storage system file system entries or change events into a homogenized set of catalog engine 100 events;
5. persisting 125 these entries into a computer readable medium to facilitate the rapid insertion, deletion and location of files or directories matching a search criterion; and
6. searching 130 the persisted data structures to locate files or directories matching a search criterion.

Monitoring the Cataloged Storage System

At startup the catalog engine 100 retrieves the set of backups that have been successfully cataloged into the system. It then uses this information to compare the set of backups that are available on the monitored storage system.

Figure 2A:
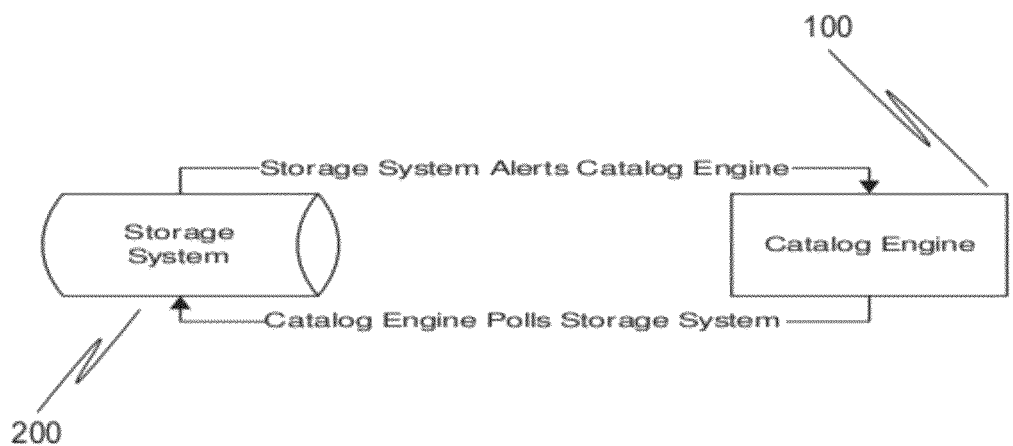
FIGS. 2A and 2B illustrate state interactions between a storage system, storage system agent and catalog engine in accordance with embodiments of the invention.
Figure 2B:
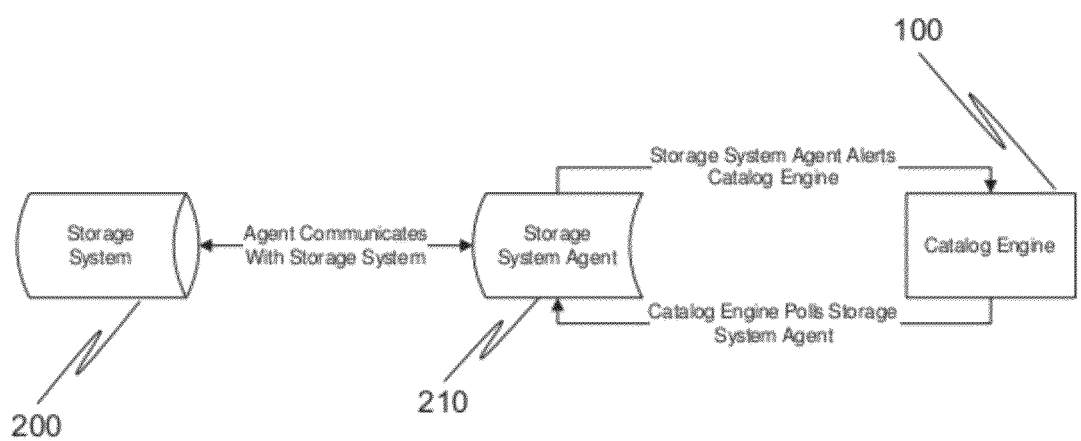

FIGS. 2A and 2B shows examples of state interactions between the catalog engine 100 and the (catalogued) storage system 200. Referring to the examples of FIGS. 2A and 2B, this monitoring may take place by any combination of:

1. the catalog engine 100 polling the storage system 200 for its state;
2. the storage system 200 alerting the catalog engine 100 of an altered state;
3. the catalog engine 100 polling an agent 210 for the storage system 200 for the storage system's state; and
4. an agent 210 for the storage system 20 alerting the catalog engine 100 of an altered state on the storage system 200.

Synchronization

If discrepancies are detected between the catalog engine 100 and the storage system 200 backups, then the catalog engine 100 will synchronize its catalog with the storage system 200. Synchronization is achieved by determining the differences between the set of backups that are known to the catalog engine 100 and the set of backups that are known to the storage system 200. This includes both additions and deletions.

Data Acquisition

When the catalog engine 100 becomes aware that a backup is available on the storage system that is not currently in the catalog it will acquire the contents of the backup from the storage system. The acquisition of the contents may take many forms. It may, amongst other things, be a listing of the changed files, a listing of changed file system pointers or inodes, a list of changed storage blocks, a complete listing of all of the files on the storage system, or a combination of these things.

Acquiring Data from Virtual Machine File Systems

Many times the monitored storage system 200 may be a virtual machine hypervisor. If this is the case then the hypervisor may be queried either directly or through an agent to obtain data on the guest file systems.

At other times the catalog engine 100 may notice that the files that have changed in a backup represent the virtualized file systems of virtual machines. In this case the catalog engine 100 may interrogate the virtual machine files to acquire data for cataloging.

The contents of a backup on a storage device may represent the logical unit numbers (LUNs) of a file system that is mounted by a separate machine. For example, the backup on the storage device may represent the LUNs of a file system mounted by a VMware® ESX™ server. These LUNs may then themselves contain the virtualized file systems of virtual machine guests. If the catalog engine 100 detects that the backup is of LUNs of a file system containing virtual machines it may mount the LUNs and interrogate the virtual machine files to acquire data for cataloging.

Correlating File System Entries or Change Events

The catalog engine 100 processes the data acquired from the storage system and correlates the primitive data acquired into higher level catalog engine 100 events. It performs work to correlate storage system specific entries or events into a homogeneous set of record types. These types of events are stored as records in the catalog. An exemplary description of record types is described in the table below:

| Record type | Description |
| --- | --- |
| directoryCreate | The creation of a new directory. |
| directoryMove | The move of a directory and its children from one location in the file system to another. |
| directoryDelete | The deletion of a directory and its children. |
| fileCreate | The creation of a file. |
| fileModify | The modification of a file's attributes, such as size and dates. |
| fileDelete | The deletion of a file. |

Persisting Entries into a Computer Readable Medium

As a monitored storage system makes point-in-time backups of its contents there are a set of read-only file systems created that represent the state of the source file system at the point-in-time that the backup was taken.

Figure 3:
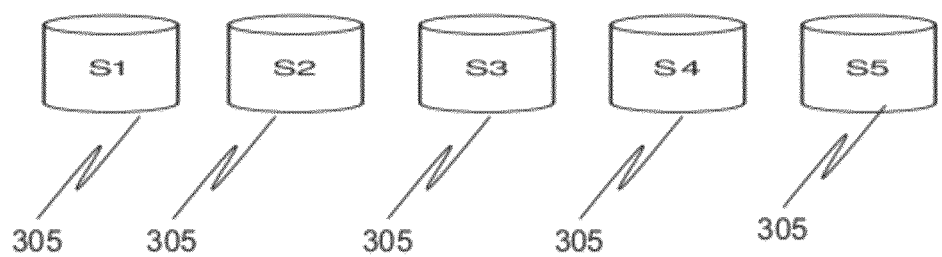
FIG. 3 illustrates a file system and associated backups.

The catalog engine 100 builds a catalog of the complete contents of each of these file systems. FIG. 3 illustrates five backups 305 taking at five different points in time, S1, S2, S3, S4, and S5, although more generally there may be an arbitrary whole positive number, M, of backups.

The catalog has two key high level innovations that enable its scale and efficiency:
1. the structures representing a file system are independent from any other cataloged file system and the structures representing a backup are only loosely coupled to their younger sibling; and
2. the structures store change lists or deltas of the differences between the backups, not their contents.

Independent Structures for High Scalability

Figure 4:
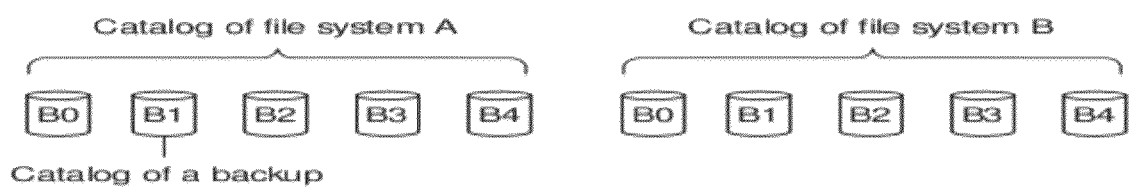
FIG. 4 illustrates backup structures grouped into a file system in accordance with an embodiment of the invention.

The catalog engine 100 constructs a horizontal database where each backup catalog is contained in one logical database structure. Each of these backup structures are grouped together to represent all of the backups of a file storage system. This is illustrated in FIG. 4, where each file storage system, such as file system A and file system B, has its backups structured grouped into a file storage system.

Figure 5:
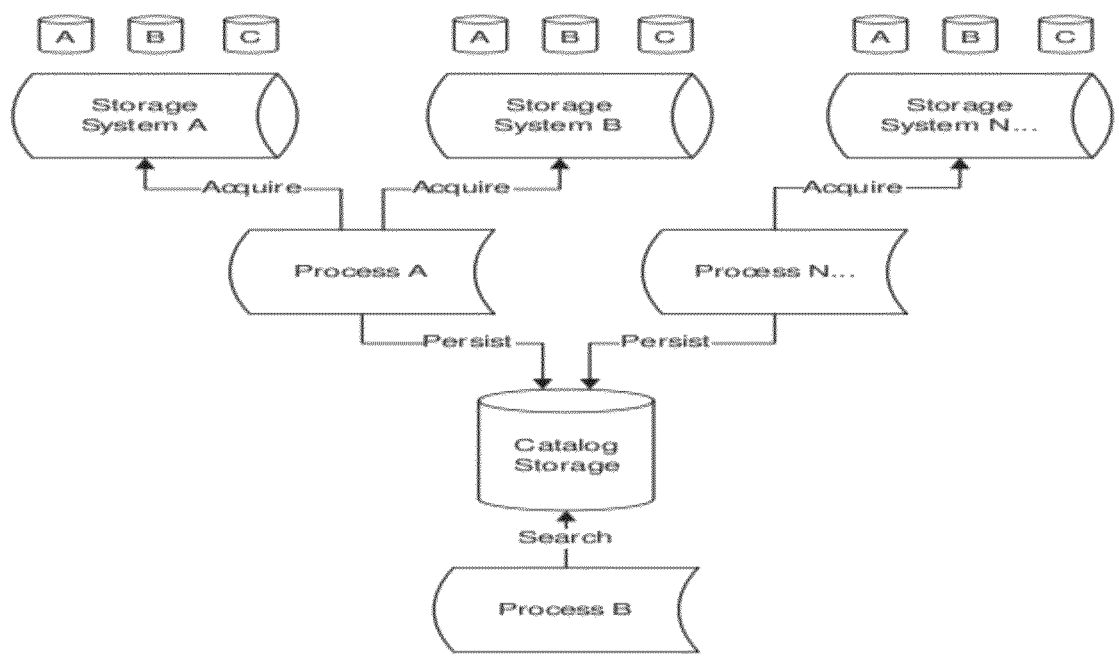
FIG. 5 illustrates independent processors cataloging a set of N file systems in accordance with an embodiment of the invention.

FIG. 5 illustrates an exemplary application that is scalable and in which independent processors catalog an arbitrary number, N, of different file systems. Each processor includes corresponding hardware and software (e.g., on one or more servers) to implement a cataloging process to catalog records in a central catalog. This permits, for example, a central catalog to be searchable for catalog information from the N different file systems.

An approach of independent file system catalogs grouping loosely coupled backup structures is pivotal to the catalog engine 100's ability to scale. This approach allows:
1. independent processes to acquire data and build the structures on a per file system level;
2. complete file system catalogs to be added and removed entirely independently of any of the other contents of the catalog and with no additional overhead as the catalog grows;
3. new backup catalogs to be appended to the end of a file system catalog without any interaction with the other structures of the catalog and with no additional overhead as the catalog grows;
4. backups to be deleted from the catalog while only affecting the structure representing the backup and its next younger sibling and with no additional overhead as the catalog grows; and
5. a lockless approach for both writing and searching with no requirement on any central structure.

Base Plus Deltas

Figure 6:
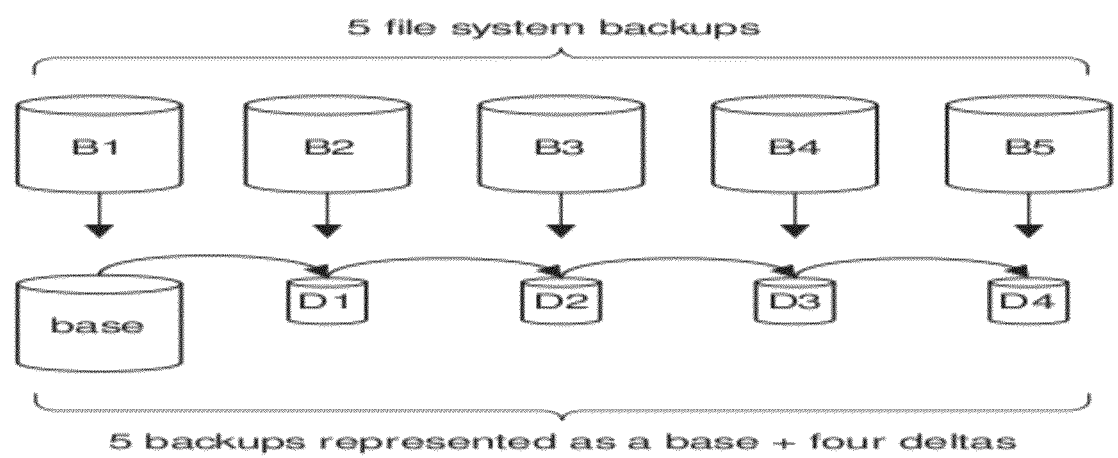
FIG. 6 illustrates an example of five file system backups represented as a base and four deltas or change lists.

FIG. 6 illustrates an embodiment in which system backups, B, are represented as a base and deltas (D1, . . . DN, with four deltas being shown for the purposes of illustration) to represent alterations to the base at subsequent points in time. At the backup level, rather than building a structure which contains the contents of each of the file system backups, the catalog instead contains:
1. a baseline database of the complete contents of the oldest cataloged backup; and
2. a set of change lists, or deltas, of the alterations that have happened to the file system between a backup and its next younger sibling.

Figure 7:
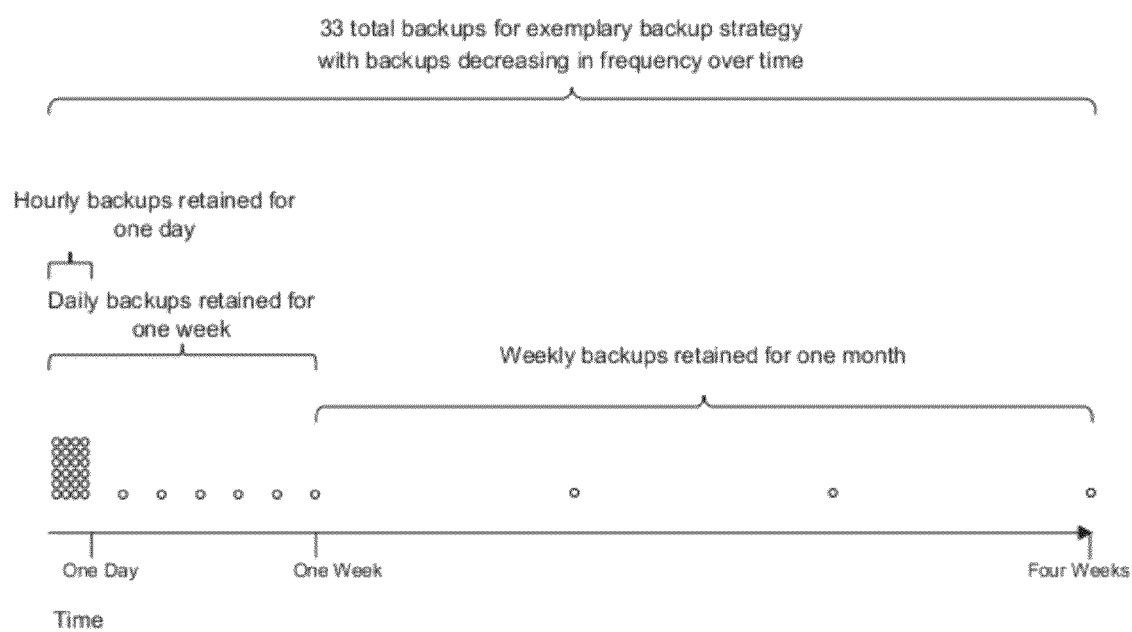
FIG. 7 illustrates an example of backups over a month for an hourly, daily, weekly backup schedule.

This representation of backups is important because the creation of a backup on a storage system may generate millions of new data points to be cataloged, yet the difference between the backup and its next sibling may be very minor. This is particularly true when considering many backup strategies involve backups decreasing in frequency over time, as illustrated in FIG. 7. FIG. 7 shows backup instances (versus time). A common strategy is hourly (the 24, clustered circles of FIG. 7 within a one day period), retained for a day; daily, retained for a week; weekly, retained for a month. This strategy produces 33, backups containing approximately 33 times the number of files on the active file system. The number of changes between the younger backups (the hourly's) is very small when compared to the number of files contained in the file system.

Structures

The baseline and delta structures are internally identical with the only difference been their size and the nature of the records they hold (all baseline records are for creates).

Figure 8:
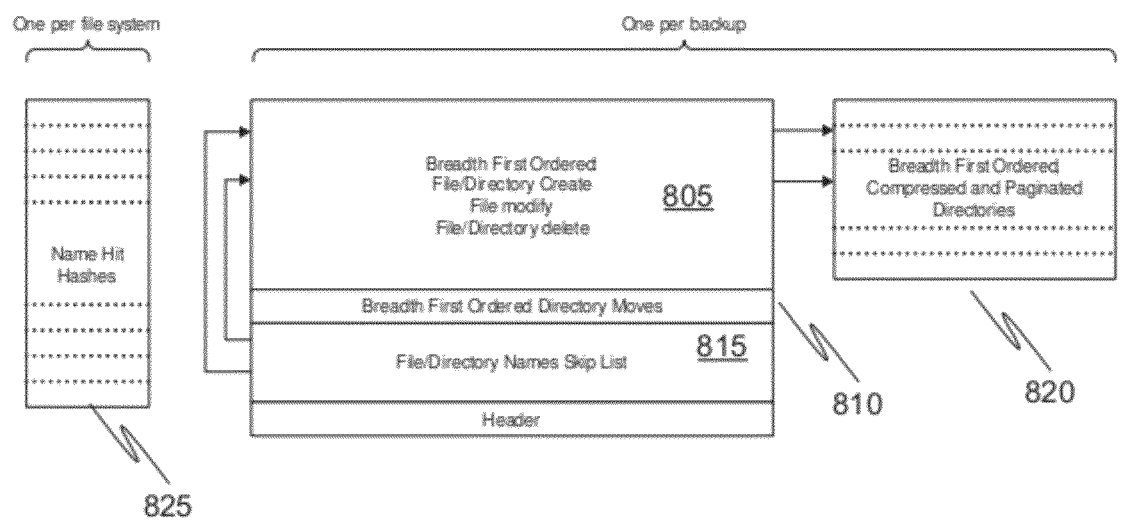
FIG. 8 illustrates an exemplary backup structure in accordance with an embodiment of the invention.

FIG. 8 illustrates an exemplary backup structure for storing directory metadata. Each backup structure comprises four distinct elements:
1. a breadth first ordered set of entries or change records 805 with a pointer to the directory;
2. a breadth first ordered set 810 of directory moves;
3. a sorted skip list 815 of file and directory names with a pointer to the entry record; and
4. a breadth first ordered set 820 of directory paths, divided into compressed pages.

In addition each file system has a unique sorted set of four byte hashes 825 of the file or directory names, arranged in pages on a memory boundary for efficiency, e.g., 4K pages.

Hash Hit Index

Each entry in the names skip list is hashed, sorted and persisted into pages for each backup in a file system. The lead entry of each page is then cached into memory.

This index allows searches for a full file name to immediately bypass an entire file system if the hash of the name is not present in the hash hit index.

Robust Atomic Bulk Insert and Delete

Because the individual backup catalog structures are so loosely coupled to any of the other structures in the catalog they can be independently built and deleted without the need to place any other structures into an invalid or half committed state. This avoids the need for the overhead of any double writing or the maintenance of a transaction log.

To support robust atomic bulk insert, the catalog engine 100 bulk inserts the individual records into a newly created structure held in a temporary state. Only when the structure is fully built is its state atomically changed in one action to indicate that it should now be included in the catalog. If the process is terminated in an intermediate state then the structure will be deleted at next startup and the process started over to ensure this operation is atomic.

To support robust atomic bulk delete, the catalog engine 100 firstly rolls the deleted backup structure up into a new temporary structure containing a merge of itself and that of its next younger sibling. Only when this new structure is fully built is its state atomically changed in one action to indicate that it should now be included in the catalog. In the same atomic action the structures of the deleted backup and the younger sibling are deleted from storage. If the process is terminated in an intermediate state then the structure will be deleted at next startup and the process started over to ensure this operation is atomic.

Rolling Up Database Entries

There is no guarantee that the storage system will retain the set of backups in the order that the catalog engine 100 has built its catalog. While new backups will always be added to the head of the catalog, backups may be deleted from anywhere within the catalog.

Figure 9A:
FIGS. 9A and 9B illustrate an example in which a delta, D2, is deleted and the changes are rolled into a new delta, D3 in accordance with an embodiment of the invention.
Figure 9B:
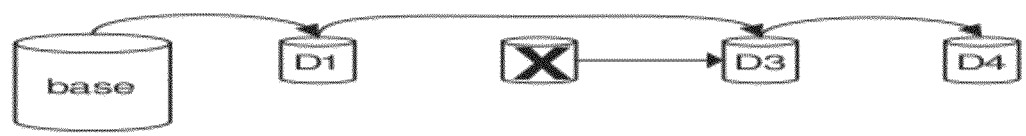

FIG. 9A illustrates a base and deltas D1 to D4. Referring to FIG. 9B, when a backup is deleted in one embodiment it causes a "rollup" of the deleted catalog engine 100 structure into its younger sibling. The newly rolled up structure will therefore contain a list of the changes that occurred both between the deleted backup and those of its younger sibling.

By way of example with reference to FIG. 9A, the base catalog holds a list of all the files and directories. D1 is a list of the changes to that base that are required to bring it in-line with the next backup. D2 is a list of the changes to a reassembled D1 that are required to bring it in-line with its backup, and so on. Referring to FIG. 9B, if a backup is deleted in the chain; say D2; then D3 should hold both the D1 to D2 changes as well as the D2 to D3 changes. This effectively makes D3 a D1 to D3 change list.

Figure 10:
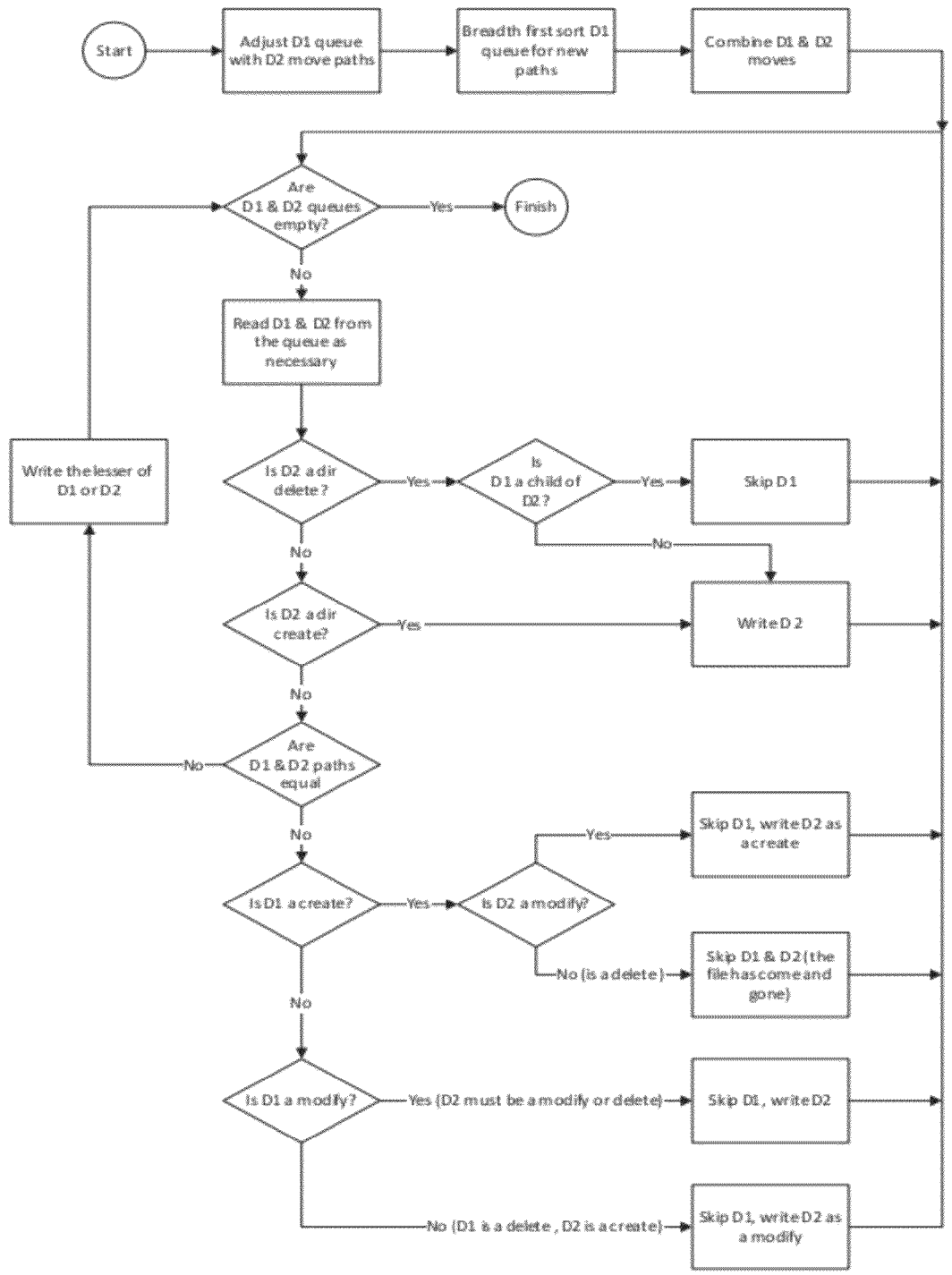
FIG. 10 illustrates an exemplary rollup algorithm in accordance with an embodiment of the present invention.

FIG. 10 illustrates an exemplary rollup algorithm, illustrating how a rollup algorithm can take into account various scenarios, such as the deletion, modification, or creation of individual deltas. In the example of FIG. 10, the rollup algorithm is used to roll two delta change lists, D1 and D2, into a modified D2. The flow chart illustrates difference scenarios, depending in part whether D2 is a directory create or directory delete and also whether D1 is a create or modify.

Searching the Catalog

In an enterprise application there may be numerous files and numerous points in time that are backed up. A search in the catalog for a particular file has no foreseen completeness or proof of closure. That is, it is desirable to have a methodology to efficiently search and pay search costs late.

The catalog engine 100 treats different search criteria in different ways. In one embodiment there are three distinct types of queries that result in three different search strategies. In a full name query, the full name of the file is used in searching. A check of the index of hashes rules out a volume immediately. The skip list is used if there is a hit. In a "Starts-with" query, the first n characters of a file name are utilized and the skip list is used. Other queries may be used, including another more sophisticated query including any wild cards or matching criteria. An optimize scan of skip list leaf entries may be performed.

Figure 11:
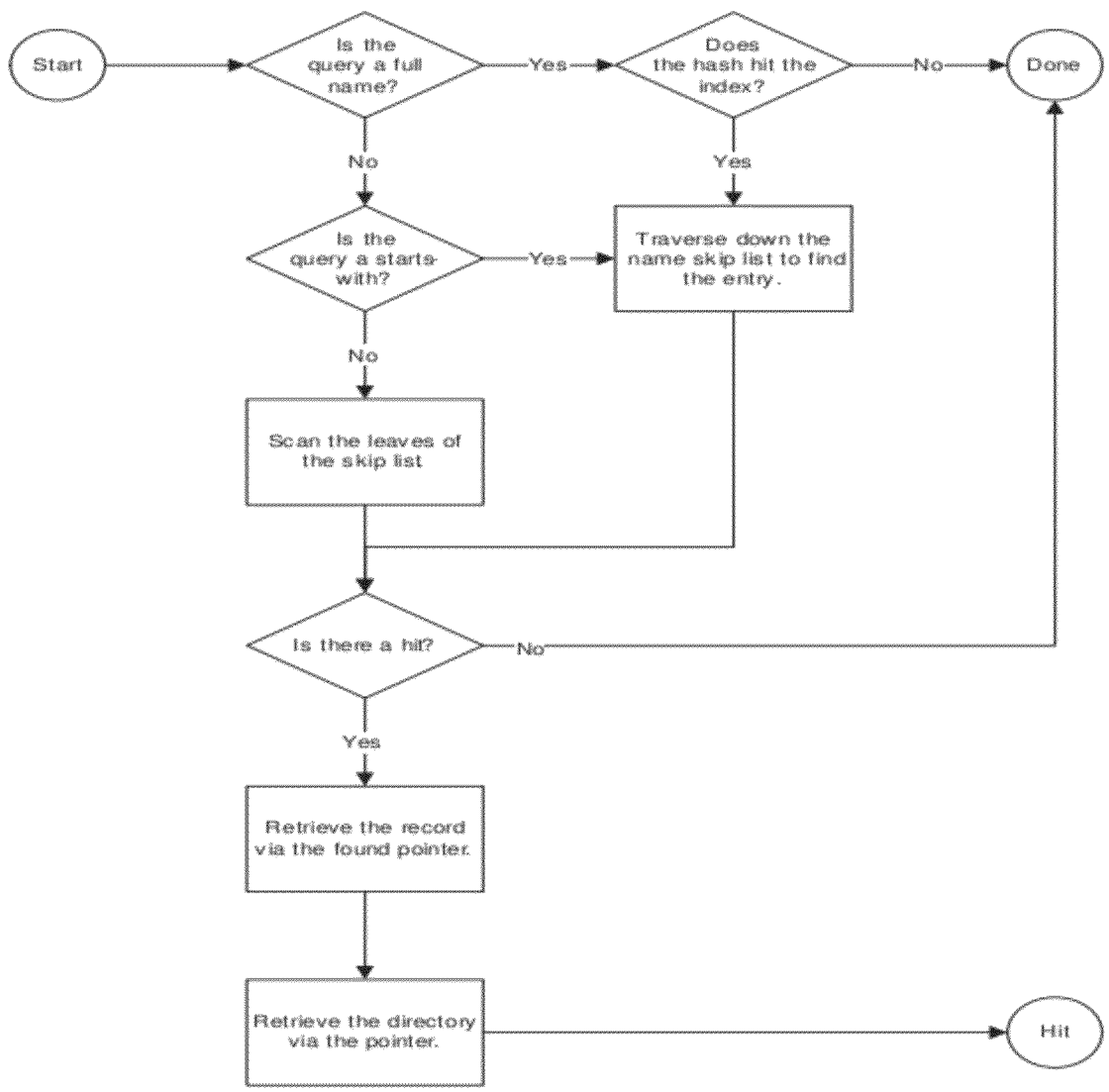
FIG. 11 illustrates an exemplary search algorithm in accordance with an embodiment of the invention.

FIG. 11 illustrates an exemplary search algorithm for a file system. A hit hash may be used to discard searching whole volumes quickly. Other aspects related to efficient searching are illustrated in FIG. 11. In particular, FIG. 11 shows an exemplary flow chart sequence for searching using a full name query and starts-with query.

Network Backup Usage Example

The catalog engine 100 of the present invention may be used in a complementary fashion with prior art backup solutions that capture the raw backup data. Prior art backup products are able to capture backup data. Additionally, prior art backup up products may be used to create "incremental" backups where only the changes between a previous backup and the active backup are taken. In addition backup products can create a "synthetic full" where a full backup can be generated internally from a full backup plus the incremental backups. However, this prior art is significantly different from embodiments of the catalog engine 100 for at least two reasons because:
1. the prior art is a backup of the file system data, not a searchable catalog of its metadata; and
2. in the prior art an incremental backup cannot be removed from the chain without eliminating the capability to restore these incremental backups.

Embodiments of the catalog engine 100 can be used in conjunction with commercial products that provide the raw backup data, such as products that provide snapshots of files. This solves a problem in the prior art, as commercial products in the prior art do not have a means to effectively catalog snapshot data nor do they provide a searchable catalog. The catalog engine 100 addresses these problems and may be used in a complementary fashion with commercial backup products to provide a cataloging solution for backup data.

Figure 12:
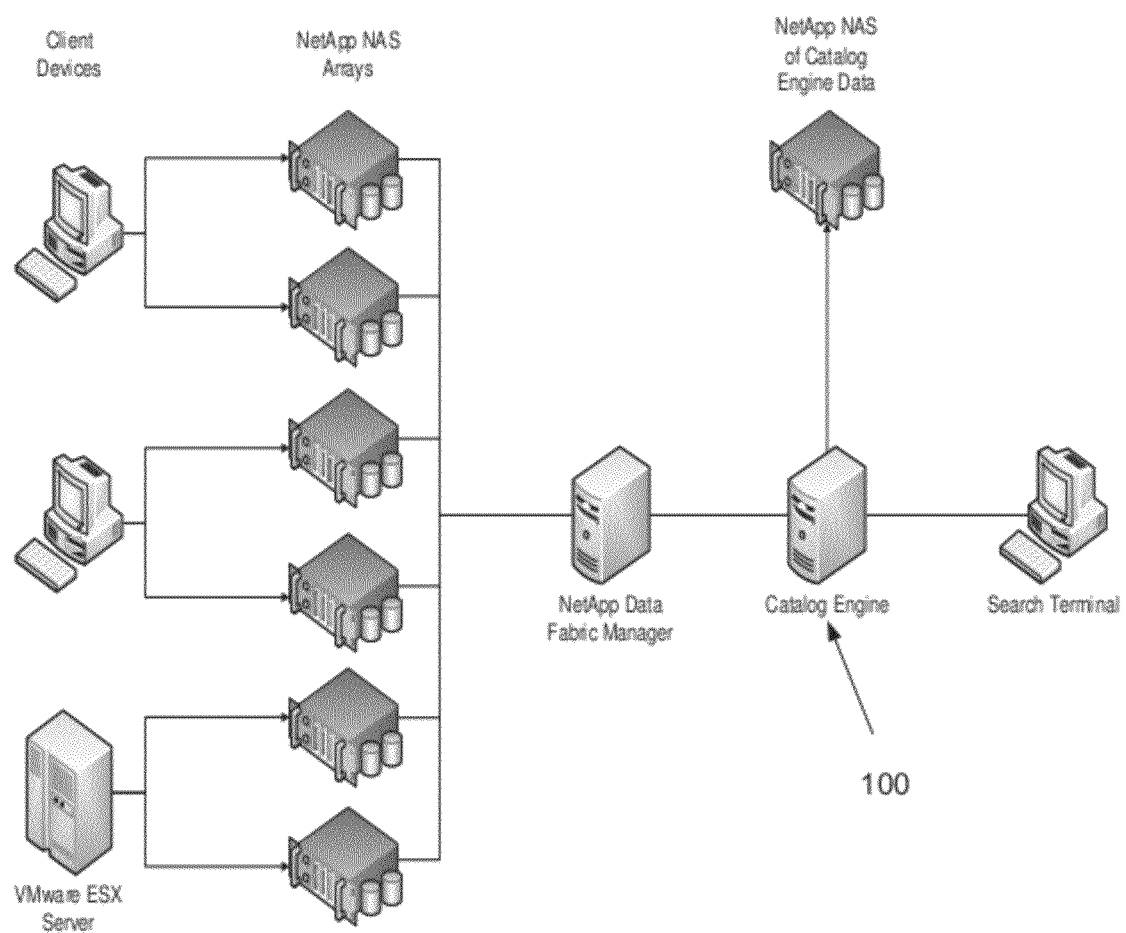
FIG. 12 illustrates an exemplary usage example in accordance with an embodiment of the invention.

FIG. 12 is an example provided to illustrate the real world use of an embodiment of the invention with the catalog engine 100 interacting with commercially available products directed to the use of backup data such as backup products of NetApp® of Sunnyvale, Calif., including its network attached storage system (FAS™ product line). FIG. 12 illustrates different software products operating on client devices and on servers operating on hardware/software platforms.

NetApp® network attached storage systems (FAS™ product line) are present on an enterprise network. A NAS array provides a file system and disk storage system over a network. The file system enables features such as snapshots for recovering files.

Client devices connect to these network attached storage systems and save a constant stream of new and modified files through Network File Share (NFS) file shares to the volumes contained on the NetApp® arrays.

A VMware® ESX™ server also stores the virtual hard drives of its guest VMs on the Arrays via an NFS file share. The VMware® ESX™ server is a product of VMware of Palo Alto, Calif.

NetApp® Data Fabric® Manager is deployed on a dedicated server to manage the Arrays and takes constant snapshot backups of the volumes on a backup policy of hourly, retained for a day; daily, retained for a week; weekly, retained for a month.

The catalog engine 100, running on a dedicated server, polls the NetApp® DataFabric® Manager, which is acting as an agent for the NAS® network attached storage systems (NetApp® FAS™ product line), to identify any new or deleted backups. If it notices a difference between the NetApp® DataFabric® Manager state and the catalog engine 100 state then it queries the Array for a listing of the files that have changed, persisting these into its catalog. Any deleted backups are internally rolled up. If the catalog engine 100 notices that a changed file is a VMware Virtual Machine Disk (VMDK) file then it inspects the file for changes and persists these into the catalog.

In one embodiment the catalog engine 100 saves its own internal data structures onto another NetApp® network attached storage system (NetApp® FAS™ product line).

A search terminal queries the catalog engine 100 for the location of files or directories via a web services interface provided by the catalog engine 100 server.

In this use example, note that the catalog engine 100 is cataloging backup data over time for an enterprise network. No known backup product performs such a cataloging function.

Alternate Embodiments

It will be understood that while examples have been provided for an apparatus, system, methods, and computer readable medium, that the scope of the present invention is not to be limited to these examples and that many variations and equivalents are contemplated as being within the scope of the invention.

As one example, while the catalog engine 100 may be implemented as a standalone cataloging solution, it will also be understood that it could also be bundled or otherwise integrated with conventional backup software products to provide a total backup solution in a storage system to both backup files in a network and also perform cataloging of the backup data.

It will also be understood that while an exemplary usage example discusses specific commercially available backup software that the catalog engine 100 could be used with other backup software.

While exemplary algorithms, data structures, and software modules have been described, it will also be understood that variations on these are contemplated, including using subsets and variations of elements that are described in regards to the illustrated examples.

It will also be understood that the present invention is related to improvements over an earlier application by the Assignee of the present invention. In particular, U.S. patent application Ser. No. 12/814,310, "CATALOG THAT STORES FILE SYSTEM METADATA IN AN OPTIMIZED MANNER" published with publication number 2010-0325181, is hereby incorporated by reference for all purposes. Specifically, U.S. patent application Ser. No. 12/814, 310, provides background information on a system, method, and computer readable medium cataloging and using metadata stored in an optimized manner. The present application relates to an improvement of the cataloging described in the earlier application applied to snapshots of backups.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A computer implemented method, the method comprising:
    monitoring, by a catalog engine, the creation or deletion of point-in-time backups from each of a plurality of N different file systems in which independent processes are utilized to acquire data from each of the N different file systems;
    determining, for each of the N different file systems, differences between a set of backups known to the catalog engine and to backups known by each of N different file systems;
    building a central catalog of directory metadata based on the determined differences between the set of backups known to the catalog engine and the backups known by each of the N different file systems, the central catalog of directory metadata including a set of independent backup catalogs representing the N different file systems in which each individual backup catalog represents point-in-time backups of a respective one of the N different file systems;
    wherein the central catalog is organized in metadata records and is tangibly embodied in the at least one tangible computer readable medium organized in records arranged as baseline files and deltas, and the metadata records for the N different file systems are stored as N independent backup catalog structures including pointers to files and directories of the plurality of different file systems;
    wherein each record for an individual backup file catalog has a file structure that includes:
        an index of hashes of directory names for the N different file systems;
        a breadth first ordered set of entries or change records that have happened between a backup and its next younger sibling, with a pointer to the directory metadata;
        a breadth first ordered set of directory moves divided into compressed pages;
        a sorted skip list of file and directory names with a pointer to the entry record, wherein each entry in the skip list of file and directory names is hashed and stored in the index of hashes; and
        a breadth first ordered set of directory paths, divided into compressed pages.

2. The method of claim 1 wherein the metadata records are stored in a logical sequence that is in a breadth first manner of a hierarchical structure.

3. The method of claim 1, wherein the directory metadata that is acquired for cataloging an individual backup file catalog includes one or more of: listing of changed files, a listing of changed file system pointers or inodes, a list of changed storage blocks, a complete listing of all of the files on an individual file system.

4. The method of claim 1, wherein in the event that a delta file is deleted for a data structure of a backup file catalog, a rollup is performed in the cataloged deltas to adapt the catalog for the individual file system.

5. The method of claim 1, further comprising processing the directory metadata acquired from a storage system and to correlate primitive data acquired into higher level catalog engine events into a homogeneous set of record types.

6. The method of claim 1, further comprising searching the catalog to identify metadata for backup files in response to a query, including performing at least a portion of the searching via hashed information of the file structure of the individual backup file catalog.

7. A computer readable media product comprising a non-transitory computer readable medium causing a processor to implement any of the methods of claim 1, 2, 3, 4, 5, or 6.

8. A catalog engine comprising a processor and a memory, the catalog engine configured to implement any of the methods of claim 1, 2, 3, 4, 5, or 6 to catalog snapshot data generated by a separate backup system.

9. A computer implemented method, the method comprising:
    monitoring, by a catalog engine, the creation or deletion of point-in-time backups from each of a plurality of N different file systems in which independent processes are utilized to acquire data from each of the N different file systems;
    determining, for each of the N different file systems, differences between a set of backups known to the catalog engine and to backups known by each of N different file systems;
    building a central catalog of directory metadata based on the determined differences between the set of backups known to the catalog engine and the backups known by each of the N different file systems, the central catalog of directory metadata including a set of independent backup catalogs representing the N different file systems in which each individual backup catalog represents point-in-time backups of a respective one of the N different file systems, wherein the central catalog is organized in metadata records and is tangibly embodied in the at least one tangible computer readable medium organized in records arranged as baseline files and deltas, and the metadata records for the N different file systems are stored as N independent backup catalog structures including pointers to files and directories of the plurality of different file systems and each record for an individual backup file catalog has a file structure that includes:

1) index of hashes of directory names for the N different file systems;
2) a breadth first ordered set of entries or change records that have happened between a backup and its next younger sibling, with a pointer to the directory metadata;
3) a breadth first ordered set of directory moves divided into compressed pages;
4) a sorted skip list of file and directory names with a pointer to the entry record, wherein each entry in the skip list of file and directory names is hashed and stored in the index of hashes; and
5) a breadth first ordered set of directory paths, divided into compressed pages;

independently adding a new backup catalog to the central catalog;

independently deleting a backup catalog from the central catalog;

deleting a delta file for a data structure of a backup catalog by performing a rollup in the cataloged deltas to adapt the backup catalog for the individual file system; and searching the catalog to identify metadata for backup files in response to a query, including performing at least a portion of the searching via hashed information of the file structure of the individual backup file catalog.

* * * * *